United States Patent Office 2,857,429
Patented Oct. 21, 1958

2,857,429
PROCESS FOR RECOVERING PURE PHTHALIC ACIDS

Herman A. Bruson, North Haven, and Alan E. Ardis, Hamden, Conn., assignors to Olin Mathieson Chemical Corporation, New Haven, Conn., a corporation of Virginia No Drawing. Application April 11, 1956
Serial No. 577,442

4 Claims. (Cl. 260—525)

This invention relates to an effective and economical process for recovering pure terephthalic acid and isophthalic acid from mixtures containing the isomeric phthalic acids and organic impurities.

Derived by subjecting the corresponding isomeric xylenes to oxidation, terephthalic acid and isophthalic acid have recently become important starting materials for the manufacture of many polymers and plasticizers for resins. Inasmuch as the primary requirements have been either for substantially pure terephthalic acid or for isophthalic acid, mixtures of these isomeric acids have found only very limited usage. Because of stringent requirements for purity, it has been necessary to devise procedures to separately obtain the pure terephthalic acid and isophthalic acid. Initially, these procedures were predicated on the separation of intermediates, such as the isolation of p-xylene and m-xylene prior to oxidation to the corresponding phthalic acid, or the separation of the corresponding toluic acids following partial oxidation. Since these procedures were complex and costly, further attention has been directed to separating and recovering the individual dibasic acids from mixtures containing the isomeric phthalic acids. Various methods of separation have been proposed, including preferential esterification processes, repeated treatment of the isomeric mixture with concentrated sulfuric acid as well as prior conversion of the isomeric mixture to salts followed by fractional crystallization. The practice of each of these proposals, however, has resulted in high cost and low yields, primarily because of the product recovered has required additional processing.

The present invention provides a process for separately recovering substantially pure terephthalic acid and isophthalic acid from a mixture containing the isomeric phthalic acids and organic impurities. We have found that certain organic oxygen-containing solvents selectively dissolve isophthalic acid and such aromatic acid impurities formed during the preparation of terephthalic acid by oxidation, without displaying significant solvent power for terephthalic acid.

Based upon this discovery, the separate recovery of substantially pure terephthalic acid and isophthalic acid from a mixture containing the isomeric phthalic acids and organic impurities is effected by heating the mixture with a sufficient quantity of a ketonic or ether solvent to dissolve all of the isophthalic acid and impurities at a temperature near the boiling point of the solvent, without appreciably dissolving the terephthalic acid. After separating the substantially pure terephthalic acid from the treating solvent, the isophthalic acid is crystallized and recovered from the resultant solution.

We have found that an unusually effective separation results and both pure terephthalic acid and isophthalic acid recovered in high yield when the mixture of isomeric acids is treated with solvent at a temperature close to the normal boiling point of the solvent. In this case, the quantity of solvent used preferably should be slightly in excess of that theoretically required to dissolve the isophthalic acid present in the mixture. A lower temperature may be successfully employed when larger quantities of solvent are used, but the most advantageous results accrue when the temperature is within 50° C. or less of the normal boiling point of the solvent.

The properties of those solvents which have been found to be especially effective for the purpose are indicated in the following table:

TABLE I
Ether and ketonic solvents for isophthalic and terephthalic acids

| Solvent | Boiling Point (° C./760 mm.) | Solubility in Water | Grams of Solvent at Boiling Point Req'd to Dissolve 1 gram of— | | Ratio of B/A |
|---|---|---|---|---|---|
| | | | Isophthalic Acid (A) | Terephthalic Acid (B) | |
| Ether Solvents: | | | | | |
| Diethyl Ether | 34.6 | 7.5% at 20° C | 74.4 | 500 | 6.7 |
| Ethylene Glycol Dimethyl Ether | 85.2 | complete | 30.4 | 408 | 13.4 |
| Diethylene Glycol Diethyl Ether | 188 | ----do---- | 10 | 160 | 16 |
| Triethylene Glycol Dimethyl Ether | 216 | ----do---- | 16.4 | 86 | 5.2 |
| Dioxane | 101.3 | ----do---- | 14.5 | 280 | 19.3 |
| Tetrahydrofuran | 65 | very soluble | 9.0 | 112 | 12.4 |
| 2,3-Dihydro-2-formyl-1,4-pyran | 150.6 | complete | 14.2 | 138 | 9.7 |
| Ketonic Solvents: | | | | | |
| Acetone | 56 | ----do---- | 52.6 | 1076.6 | 20.4 |
| Pentane-2,4-dione | 140.5 | 16.6% at 20° C | 26.4 | 464.2 | 17.5 |
| Cyclohexanone | 155.7 | 2.4% at 31° C | 10.1 | 150 | 15 |

Each of the above preferred solvents not only has considerably greater solvent power for isophthalic acid than for terephthalic acid, but readily dissolves colored impurities and aromatic acid impurities such as toluic and benzoic acids. Although we have found that many substances display solvent power for isophthalic and terephthalic acids, the most advantageous solvents should be capable of dissolving at least five times as much isophthalic acid as terephthalic acid. Inasmuch as the practical utility of any solvent is limited when excessively large equipment is required, the most effective solvents for our invention should also be capable of dissolving at least 1 percent by weight of isophthalic acid.

Removal of the last traces of solvent from the recovered terephthalic acid may be facilitated by using a solvent having either a boiling point below 150° C. or an appreciable solubility in water or both of these properties. When using such a solvent, the removal of the residual traces may be accomplished by drying the terephthalic acid at moderate temperatures or by triturating the terephthalic acid with water.

Notwithstanding a structural similarity to the most effective solvents listed in Table I, several closely related compounds have been found to be unsuitable for various reasons. To illustrate this lack of similarity of solvent property, the following table indicates the properties of some of those solvents found to be undesirable:

TABLE II

*Undesirable ether and ketonic solvents for isophthalic and terephthalic acids*

| Solvent | Boiling Point (° C./760 mm.) | Solubility in Water | Grams of Solvent at Boiling Point Req'd to Dissolve 1 gram of— | | Ratio of B/A |
|---|---|---|---|---|---|
| | | | Isophthalic Acid (A) | Terephthalic Acid (B) | |
| Ether Solvents: | | | | | |
| Dibutyl Ether | 142 | slightly soluble. | 373.4 | 2134 | 5.7 |
| Diethylene Glycol Dimethyl Ether | 162 | complete | 16.8 | 66 | 3.9 |
| Tetraethylene Glycol Dimethyl Ether | 275.3 | do | 8 | 29.1 | 3.6 |
| Ketone Solvent: | | | | | |
| Methyl Ethyl Ketone | 79.6 | 35% at 10° C | 113.4 | 813.8 | 7.2 |

Among the solvents listed in Table II both dibutyl ether and methyl ethyl ketone dissolve more than five times as much isophthalic acid as terephthalic acid, but have a very low solvent affinity for isophthalic acid. Since both of these solvents require appreciably more than 100 grams to dissolve one gram of isophthalic acid, extensive equipment both for processing and solvent recovery would be necessary. Conversely, isophthalic acid is very soluble in both diethylene glycol dimethyl ether and tetraethylene glycol dimethyl ether, but both solvents dissolve only about three times as much isophthalic acid as terephthalic acid. Thus, although closely related to the preferred solvents, the solvents listed in Table II are unsuitable for effectively and economically separating terephthalic acid and isophthalic acid from mixtures of the isomeric acids.

The following specific examples are illustrative embodiments of the efficient separation process accomplished by this invention:

EXAMPLE 1

A mixture containing 80% by weight of isophthalic acid and 20% by weight terephthalic acid was prepared. 10 parts by weight of this mixture and 165 parts by weight of dioxane were mixed in a flask, provided with a reflux condenser, and maintained under reflux for 20 minutes. The mixture was then filtered at the boiling temperature on a heated gravity filter. The filter cake was then washed with 10 parts by weight of boiling dioxane and dried.

The recovered and dried filter cake amounted to 1.92 parts by weight. Infrared analysis indicated that it was 100% terephthalic acid. A sample was converted to the dimethyl ester and was found to have a melting point of 140° C., in agreement with the value reported in the literature.

The filtrate from the above procedure was evaporated to 75 parts by weight, cooled to room temperature, allowed to stand for 2 hours, and filtered. After being washed with water, the filter cake was dried for 4 hours under vacuum at 80° C. resulting in the recovery of 7.97 parts by weight of product. This was shown to be pure isophthalic acid by converting a sample to the dimethyl ester which had a melting point of 67° C., corresponding to the value of 67°–68° C. reported in the literature.

EXAMPLE 2

The procedure of Example 1 was repeated for the separation of a mixture containing 50% each of terephthalic and isophthalic acids, using 102.6 parts by weight of dioxane per 10 parts by weight of the mixture. Practically quantitative yields of terephthalic acid and of isophthalic acid were recovered, the purity being substantiated by tests as in Example 1.

EXAMPLE 3

The procedure of Example 1 was repeated for the separation of a mixture containing 20% by weight isophthalic acid and 80% by weight of terephthalic acid, using 41.3 parts by weight of dioxane per 10 parts by weight of the mixture. Practically quantitative yields of terephthalic acid and of isophthalic acid were recovered, the purity being substantiated by tests as in Example 1.

EXAMPLE 4

A mixture containing 20% by weight terephthalic acid and 80% by weight isophthalic acid was mixed with 20.8 times its weight of diethylene glycol diethyl ether. The mixture was heated to 180° C. during agitation and after being maintained at that temperature for 20 minutes, was filtered on a heated gravity filter. The filter cake was washed with a small volume of the boiling solvent, for example with about 5% of the total amount used originally. After drying in a vacuum drier, following a further washing with a small volume of more volatile solvent such as acetone, if desired, the recovered filter cake amounted to 98% of the terephthalic acid in the starting mixture, and was shown by tests as in Example 1 to be of high purity.

The filtrate was evaporated to about half its volume, cooled to room temperature and allowed to stand for 2 hours. The crystallized material was filtered, washed with water and dried for 4 hours in a vacuum drier at 80° C. The recovered product amounted to 99.4% of the isophthalic acid in the starting mixture and was shown to be of good purity by tests as described under Example 1.

EXAMPLE 5

A mixture as in Example 4 was mixed with 20 times its weight of tetrahydrofuran. After being heated under reflux at the boiling point for 20 minutes, the mixture was filtered on a gravity filter heated to the boiling point of the solvent. The filter cake was washed with a small volume of boiling tetrahydrofuran and dried in a vacuum oven. It amounted to over 90% of the terephthalic acid in the starting mixture and was shown to be of high purity by tests as described in Example 1.

The filtrate was evaporated to about half its volume, cooled to 15°–20° C. and allowed to stand at this temperature for 2 hours. The crystalline product was filtered, washed with water, and dried in a vacuum oven. The product consisted of pure isophthalic acid, as indicated by tests as described in Example 1, and amounted to 99% of the isophthalic acid in the starting mixture.

EXAMPLE 6

A mixture of isomeric phthalic acids, constituting the reaction products from an oxidation of a mixture of xylenes, was refluxed with cyclohexanone for approximately one-half hour, and the mixture filtered on a gravity filter heated to the boiling point of the solvent. After washing the filter cake with a small volume of boiling cyclohexanone, the filter cake was dried in a vacuum oven, yielding over 90 percent of the terephthalic acid present in the starting mixture. The terephthalic acid was shown to be of high purity when subjected to the tests described in Example 1.

It will be seen from the above illustrative examples that this invention provides an efficient and inexpensive process for the isolation of purified terephthalic acid and isophthalic acid from mixtures. Treatment with any of the listed solvents, or with mixtures of two or more of the same, removes other acids and impurities, including colored compounds, by dissolving them and leaves a residue of purified terephthalic acid. Isophthalic acid in purified form is subsequently recovered by crystallization from the filtrate.

In accordance with the preferred procedure, the mixture containing the isomeric phthalic acids is treated with one or more of the listed solvents at about the boiling point of the solvent, the proportion of solvent being adjusted so that some excess is present beyond the amount needed to dissolve all the isophthalic acid present, preferably an excess of 10% to 100%. The excess may amount to 200% or 300% when the preferred solvents, dioxane, cyclohexanone, or diethylene glycol diethyl ether, are used, as these are characterized by particularly small solubility ratios of terephthalic to isophthalic acids.

After agitation of the mixture with solvent at about the boiling point, the residual terephthalic acid is separated, as by filtration, centrifuging, or decantation after settling, from the solution while the latter is maintained substantially at the treating temperature. Likewise, the removal of impurities from the terephthalic acid may be accomplished by an extraction process wherein the starting mixture is treated with successive portions of one or more of the listed solvents, at about the boiling point, up to the predetermined amount. The purified terephthalic acid is then dried to evaporate the residual solvent. If desired, the terephthalic acid may be washed with a small volume of solvent before the drying step.

Purified isophthalic acid may be recovered from the solution by crystallization, generally after the solution has been cooled to room temperature. The solution may first be concentrated by the evaporation of up to about half of the solvent present. The filtrate may be re-used in the purification process.

The process of this invention thus provides a significant advance in the art in affording an inexpensive and uncomplicated procedure for the production of purified terephthalic acid and isophthalic acid from mixtures. This avoids the complexities which have been involved in prior procedures according to which it was necessary to isolate fairly pure p-xylene or p-toluic acid and then prepare terephthalic acid by the oxidation of these expensive intermediates. In contrast, this invention makes it practical to subject a crude mixture of xylenes to oxidation and isolate the pure dibasic acids directly from the oxidation mixture.

We claim:

1. The process of separating terephthalic acid and isophthalic acid from a solid mixture containing isomeric phthalic acids which comprises treating the mixture with at least one oxygen-containing organic solvent selected from the group consisting of dioxane, cyclohexanone, and diethylene glycol diethyl ether, at a temperature near the boiling point of the solvent, said solvent being capable of dissolving at least 15 times as much isophthalic acid as terephthalic acid, the amount of solvent being at least that required to dissolve the weight of isophthalic acid present in the mixture and being 10 to 40 times the said weight, separating the resulting solution at said temperature from an insoluble residue of terephthalic acid, causing isophthalic acid to crystallize from said solution, and separately recovering purified terephthalic acid and isophthalic acid.

2. The process in accordance with claim 1 using dioxane at a treating temperature of about 101° C. in a proportion of 16 to 29 times the weight of isophthalic acid present in the mixture.

3. The process in accordance with claim 1 using cyclohexanone at a treating temperature of about 155° C. in a proportion of 11 to 20 times the weight of isophthalic acid present in the mixture.

4. The process in accordance with claim 1 using diethylene glycol diethyl ether at a treating temperature of about 188° C. in a proportion of 11 to 20 times the weight of isophthalic acid present in the mixture.

References Cited in the file of this patent

UNITED STATES PATENTS

| | | |
|---|---|---|
| 2,636,899 | Burrows et al. | Apr. 28, 1953 |
| 2,746,990 | Fortuin et al. | May 22, 1956 |

OTHER REFERENCES

Meyer: Liebigs Ann., vol. 156, p. 276 (1870).

Heilbron: Dictionary of Organic Compounds, vol. IV, p. 404 (1953).